R. E. NOBLE.
MINING MACHINE.
APPLICATION FILED FEB. 26, 1914.
1,317,812.
Patented Oct. 7, 1919.
2 SHEETS—SHEET 1.
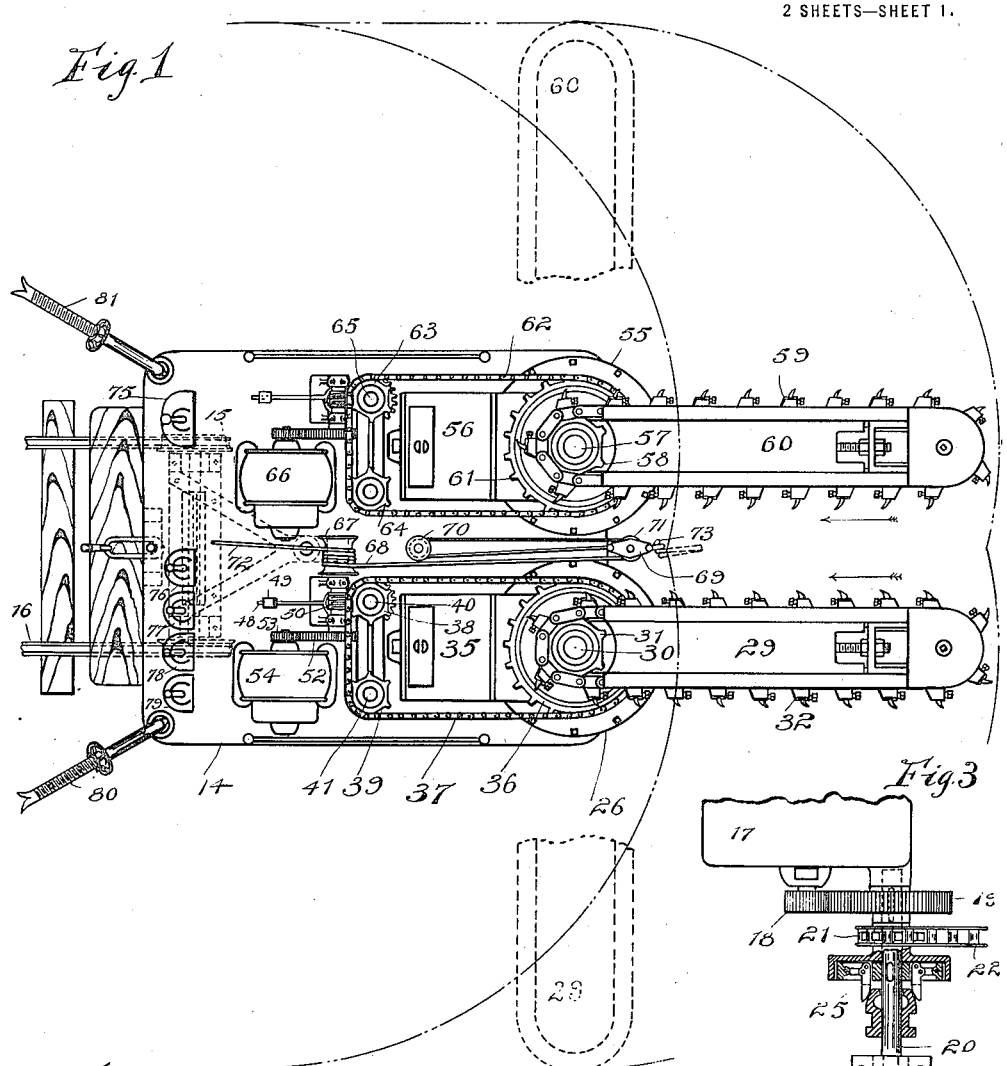
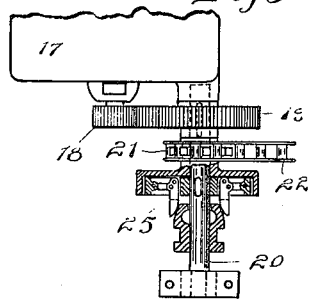
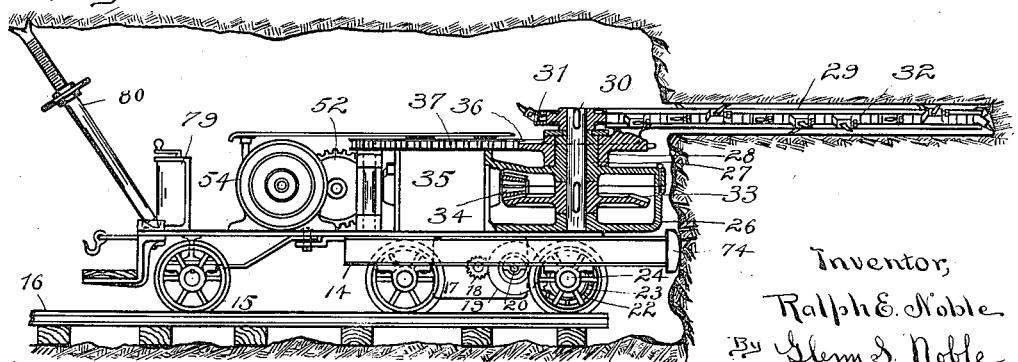
Witnesses:
Irene Forrest
Lee J. Pitner
Inventor,
Ralph E. Noble
By Glenn S. Noble
Att'y.

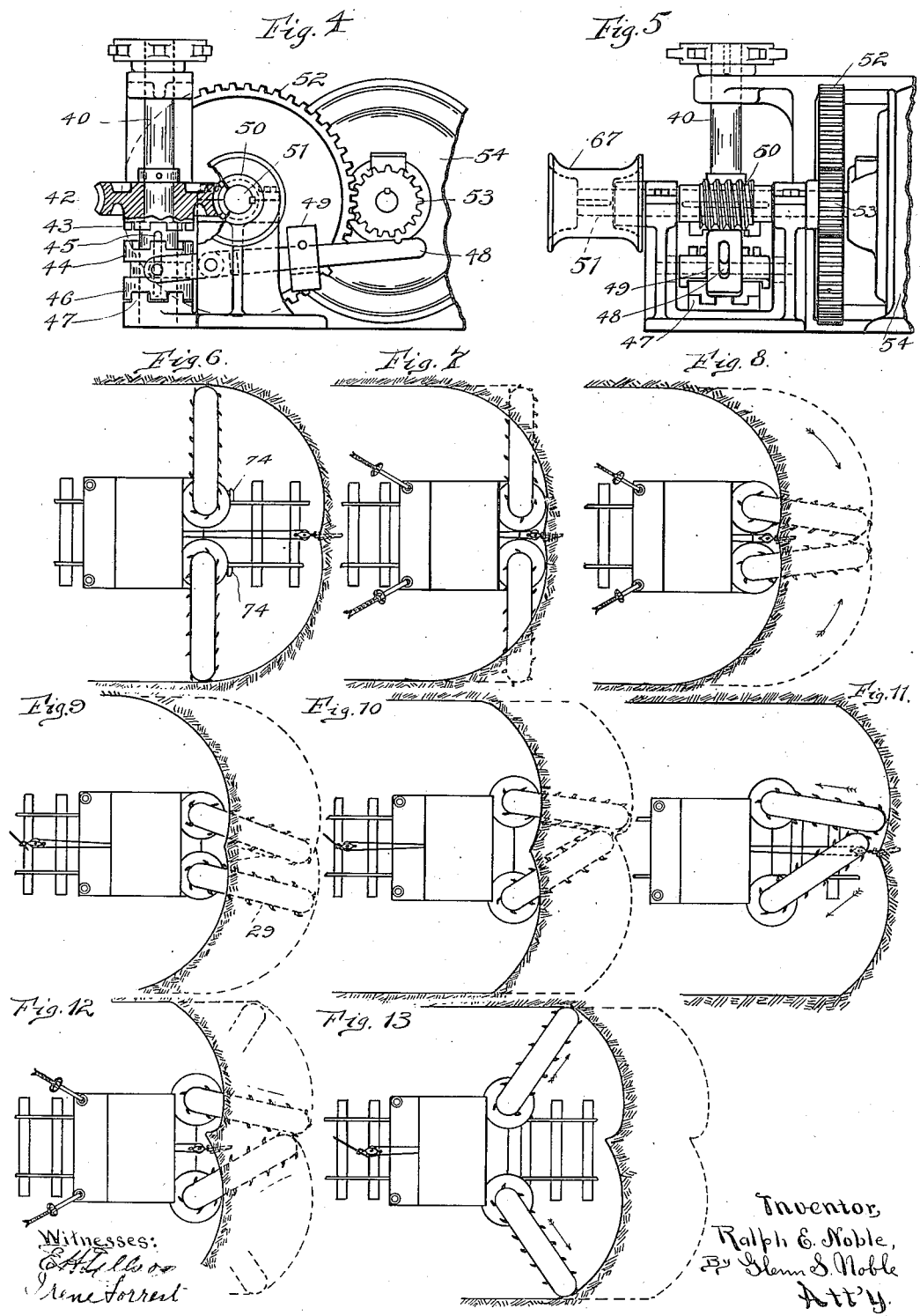

UNITED STATES PATENT OFFICE.

RALPH E. NOBLE, OF CHICAGO, ILLINOIS, ASSIGNOR TO MORGAN-GARDNER ELECTRIC COMPANY, OF CHICAGO, ILLINOIS.

MINING-MACHINE.

1,317,812. Specification of Letters Patent. Patented Oct. 7, 1919.

Application filed February 26, 1914. Serial No. 821,138.

*To all whom it may concern:*

Be it known that I, RALPH E. NOBLE, a citizen of the United States, residing at Chicago, in the county of Cook and State of Illinois, have invented certain new and useful Improvements in Mining-Machines, of which the following is a specification.

In mining machines, such as now commonly used, particularly the chain cutter bar type, a single cutter bar is usually employed, and the strains incident to feeding such cutter bar into the coal or other material to be cut, are borne either by the frame of the machine or by the machine and feeding cables and the like.

One of the principal objects of this invention is to provide a mining machine with a plurality of cutter bars arranged to be fed into the material to be cut, in such a manner as to neutralize or equalize the strains due to feeding the cutter bars into the material. Another object is to provide an improved form of mining machine which will cut a relatively wide kerf in a minimum amount of time by simultaneously cutting in two directions or from both sides of the machine. Another object is to provide an improved type of machine which may be readily adjusted or operated to meet different conditions in the cutting operation, and which will be exceedingly rapid and effective in operation. Other objects are to improve the general construction and arrangement of such machines, and to provide such desirable features as will be more fully described hereinafter.

In the accompanying drawings illustrating this invention:

Figure 1 is a plan view of the machine shown partially diagrammatically and also indicating one method of operation;

Fig. 2 is a side elevation of the machine shown in cutting position with part broken away or shown in section to illustrate the interior construction;

Fig. 3 is a detail in cross-section of the truck propelling apparatus;

Figs. 4 and 5 are details illustrating the devices for controlling the feeding mechanism; and, Figs. 6 to 13 inclusive are diagrammatical views illustrating methods of operation of the machine.

While the cutting apparatus may be mounted on any suitable frame, I prefer to mount the same on a truck having a frame or body 14 and wheels 15, so that it may move along the track 16 in the mine or other place of operation. This truck is provided with any suitable form of driving mechanism so as to make it self-propelling. For instance, the drive motor 17, is provided with a pinion 18, which meshes with a gear 19, which drives a shaft 20. The shaft 20 is provided with a sprocket wheel 21, which drives a chain 22, this chain passing around a sprocket wheel 23 on the axle 24 of the truck. The sprocket wheel 21 is provided with a clutch 25 whereby it may be thrown into and out of operative relation with the shaft 20, and this clutch is provided with any suitable means for operating the same so that the movement of the truck will be under control of the operator. The motor 17 may receive current from a flexible cable or trolley (not shown) in any well known manner.

A frame or support 26 is mounted on one side of the truck and is provided with a vertical bearing 27 upon which is pivoted a rotary head 28 carrying an arm or cutter bar 29. A vertical shaft 30 is rotatably mounted in suitable bearings in the frame 26 and passes up through the bearing 27, and is provided at its upper end with a sprocket 31 for driving the cutter chain 32, which chain is provided with cutter bits in any well known manner. The shaft 30 is provided with a gear 33 which meshes with a pinion 34 on the shaft of a motor 35 which motor furnishes power for driving the cutter chain.

The head 28 is provided with a sprocket wheel 36 which is engaged by a chain 37 which passes back and over sprocket wheels 38 and 39, which are mounted on shafts 40 and 41, having their bearings in the frame 26. The shaft 40 is provided with a worm gear 42 which turns freely thereon, but which is provided on its lower surface with clutch teeth 43, which engage with corresponding teeth in the upper end of a clutch sleeve 44, which is slidably mounted on the shaft 40, but is provided with a spline 45 so that it will turn with the shaft. The clutch sleeve 44 is provided on its lower end with teeth 46 which are adapted to mesh with corresponding teeth 47 in the upper end of the lower shaft bearing, which bearing is of course stationary, the arrangement being such that when these teeth are in engagement, the shaft 40 will be locked to prevent its turning. The clutch sleeve 44 may be shifted in any desired manner, as by means of a shifter lever 48 which is provided with an adjustable weight 49. When this weight is moved inwardly in the position shown in Fig. 4, it will be overbalanced by the weight of the sleeve 44, and the sleeve will remain in depressed position, but if the weight is moved outwardly on the lever, it will raise the sleeve until the teeth in the upper end engage with the teeth 43. The worm gear 44 is engaged by a worm 50 mounted on a shaft 51, which shaft is provided with a large gear 52, which meshes with a pinion 53 on the driving shaft of a motor 54. This motor is preferably of the adjustable speed reversible type so that the chain 37 may be driven through the intermediate gearing in either direction, and at variable speeds. By means of this driving arrangement, the head 28 with its cutter arm may be swung in either direction at any desired speed.

A duplicate cutting apparatus is mounted on the other side of the truck. This apparatus comprises a frame 55 which carries a motor 56 for driving the shaft 57 which drives the sprocket wheel 58 for the cutter chain 59, which chain is mounted on a cutter bar 60. This bar is rotated by means of the sprocket wheel 61 which is driven by a chain 62, which chain passes around the driving sprocket 63 and the guide sprocket 64. The driving sprocket 63 is mounted on a shaft 65 which is driven from a motor 66, by means of the same gear arrangement which has just been described in connection with the first cutting apparatus. The self-propelling apparatus of the truck may be used to some extent for feeding the machine into the coal, but I also provide an additional feeding apparatus, which apparatus may also be used to a limited extent for moving the truck, and may be entirely used for certain feed operations if the truck is not provided with self-propelling apparatus. For this purpose, a shaft 51 is provided with a drum or niggerhead 67, for actuating a feed rope or cable 68. One end of this rope is attached to a movable block 69 and the rope then passes around a sheave or pulley 70 on the truck, and then around the sheave or pulley 71 in the block 69, and thence several turns are ordinarily taken around the drum 67 and the operator grasps the free end 72 in order to draw in the rope. In some instances the block 69 is secured to an anchor 73 which is fixed in the coal in advance of the machine, so that this feeding device may be used for pulling the machine toward the face of the coal. In other instances, the block 69 may be secured to an anchor at the rear of the machine, for instance as indicated at Fig. 9, and the device used for drawing the machine away from the coal. The frame of the truck is preferably provided with bumpers 74 which will engage with the face of the coal when the machine is moved as far as may be desired toward the face. The controllers 75, 76, 77, 78 and 79 for the various motors are preferably arranged in a convenient location on the machine so that they may be readily operated by one operator. Jacks 80 and 81 are also provided at the rear of the machine for holding it in cutting position under certain conditions. As shown in Fig. 1, and the diagrams Figs. 6 to 10 inclusive the cutter chains 32 and 59 are driven in the directions indicated by the arrows so that their adjacent portions will be traveling in the same directions and toward the machine, the bits being properly set to cut in this direction. It will be noted that the driving apparatus may be arranged in various ways in accordance with the spirit of this invention in order to properly operate the cutter bars and perform the feeding operations, but with the arrangement shown, the machine may be operated for instance, in the following manner:

The machine is driven into a room to a point adjacent to the face of the coal and the cutter bars 29 and 60 are swung outwardly until they stand at substantially right angles with the line of the track as indicated by the dotted lines in Fig. 1. The block 69 is then secured to the anchor 73 and the cutting chains are thrown into operation and the machine fed forwardly with the arms in outstretched position until the bumpers 74 strike the face of the coal or the machine is brought sufficiently close thereto. During this movement the cutter bars will have cut along parallel lines at the sides of the room until they reach the position as indicated in dotted lines in Fig. 1, which is similar to the position shown in Fig. 7. This cutting movement will keep the sides of the room parallel. When the machine has been fed forward to the position indicated in Fig. 7, it may be held in such position by means of the jacks 80 and 81 and the cutter bars are then swung inwardly by means of the motors 54 and 66 and the driving apparatus. As the arms swing inwardly, they will cut a kerf from either side of the room as indicated in Figs. 1 and 8 and may be swung in until their outer ends approach as close as possible together, as shown in Fig. 8, at which time there will be a small amount of coal left between the kerfs. One of the arms, as for instance the arm 29, may then be swung backwardly, and the other arm continued in its forward movement a short distance, as indicated in Fig. 9 until the kerfs are joined at the outer ends of the arms. The swinging movement of the arms is then stopped although the cutter chains continue to be driven and the jacks are removed, and the block and tackle brought to the position shown in Fig. 9 for withdrawing the machine from the face of the coal. As the machine is pulled backwardly, the cutter bar 60 continues its cutting operation until it cuts out the triangular portion of coal which remained between the kerfs, thereby completing the cutting operation and making a continuous kerf across the face of the room.

Instead of using the block and tackle for withdrawing the machine, the self-propelling mechanism of the truck may be utilized for performing this last cutting operation, thereby avoiding the necessity of changing the block and tackle.

The location and method of operating the cutter bars may be varied in accordance with different cutting conditions, or as may be otherwise desired. For instance in the arrangement shown in Fig. 10, the inner ends of the cutter arms are spread sufficiently far apart so that the outer ends may be swung inwardly to the final cutting position shown in such figure, and then as the machine is withdrawn, both of the cutter bars will act upon the remaining triangular piece of coal.

Instead of running the chains in the directions in the preceding figures, they may be run in the direction indicated in Fig. 11 with the bits properly placed so that the cutting is done along the outer sides of the bars, instead of the inner sides. In making an initial cut with the chains running in this manner, the outer ends of the cutter bars are drawn close together, as shown in Fig. 11, and the machine is fed into the coal until they are fully under the coal as indicated in Fig. 12, when the forward feeding of the machine is stopped and the machine is held in such position, as by means of the jacks or other holding devices, and the bars then swung outwardly until their outer ends are substantially in alinement with the sides of the room, and then the machine is drawn backwardly as indicated in Fig. 13, until the bars cut their ways out at the sides of the room and complete a kerf, substantially as indicated in Fig. 13. These methods of operation will indicate in a general way the manner in which the machine may be utilized in cutting coal or the like, although, such operation will be greatly varied to accommodate different conditions. Although the height of the cutter bars, as shown in Fig. 2 would indicate a machine for cutting substantially midway up the face of the coal, yet such cutter bars may be arranged for under-cutting or for cutting at any desired point as regards height. From this description it will be readily seen that, during practically all of the cutting operations, the feeding stresses for one cutter arm will be substantially balanced or counter-acted by the other cutter arm, so that the machine may be held in cutting position with comparatively little force and various feeding and holding devices which have been commonly used heretofore are substantially done away with. It will also be noted that various changes may be made in the driving and propelling mechanism, as well as in the arrangement of this machine without departing from the spirit of this invention and, therefore, I do not wish to limit myself to the exact construction shown and described, except as specified in the appended claims, in which I claim:

1. A mining machine having a plurality of arms with chains provided with bits carried thereby, and means for moving said arms horizontally with respect to each other.

2. A mining machine comprising a frame, with a plurality of arms pivotally mounted thereon, cutter chains and bits carried by said arms, and means for swinging said arms horizontally.

3. In a mining machine, the combination of a main frame, two arms carrying cutter chains pivoted at the inner end thereof, power devices for feeding the machine up to the face of the coal and means for swinging said arms for feeding them into the coal.

4. In a mining machine, the combination of a main frame, two horizontally swinging arms pivoted at the inner end thereof, cutter chains carrying bits, co-acting with said arms, a draft cable acting on the inner end of the main frame, power actuating winding means coöperating with said cable to move the machine toward the face of the coal, and means for swinging said arms.

5. In a mining machine, the combination of a main frame, a plurality of horizontally swinging arms with cutter chains, pivoted at the inner end of the frame arranged in substantially the same horizontal plane, and means for swinging said arms for feeding them under the coal.

6. In a mining machine, the combination of a main frame, a pair of arms with cutter chains, pivoted at the inner end thereof, means for moving the frame and cutting apparatuses up to the face of the coal and holding it in such position, and means for swinging said arms in opposite directions to feed them into the material to be cut.

7. In a mining machine, the combination of a frame, two horizontally swinging arms, means for swinging said arms, cutter chains and bits carried by said arms, means for driving said chains, means for moving the frame comprising a stationary holder, a cable from said holder to the machine, and a winding device for winding up the cable to move the machine toward the holder.

8. A mining machine comprising a frame, a cutter bar pivotally mounted on said frame at the front end thereof, cutting devices carried by said cutter bar, means for actuating said devices, a second cutter bar pivotally mounted on said frame adjacent to the first named bar, cutting devices carried by said bar, means for actuating said devices, means for swinging said bars whereby they may be swung in opposite directions to feed the cutting devices under the coal and tending to neutralize the feeding strains.

9. A mining machine comprising a frame, a pair of cutter bars pivotally mounted adjacent to the inner end of the frame, cutter chains carried by said bars, means for driving said chains in opposite directions and means for swinging said bars.

10. In a mining machine, the combination of a truck, means for propelling said truck, a pair of cutting devices mounted on the inner end of the truck, means for actuating the cutting devices, and means for swinging said devices for feeding them into the material to be acted upon.

11. In a mining machine, the combination of a frame, means for moving said frame toward the material to be cut, means for holding said frame in adjusted position, a cutter bar pivotally mounted on one side of the frame at the inner end thereof, a cutter chain for said bar, means for driving said chain, a second cutter bar pivotally mounted on the opposite side of the frame at the inner end thereof, a cutter chain for said bar, means for driving said second named chain, means for swinging said first named bar on its pivot and means for swinging the second named cutter bar on its pivot.

12. The combination of a truck, a frame on said truck, a vertical shaft mounted in said frame at one side thereof and at the inner end, a motor and connection for driving said shaft, a cutter bar mounted concentrically with said shaft, a cutter chain for said bar, a sprocket on said shaft for driving said chain, a sprocket connected with said bar for turning the bar, a chain for said sprocket, a motor and connections for driving said chain, a second shaft mounted in said frame at the opposite side of the machine adjacent to the inner end thereof, a motor and connections for driving said shaft, a cutter bar mounted concentrically with said shaft, a cutter chain for said bar, a sprocket on said shaft for driving said chain, a sprocket connected with said second named cutter bar, a chain for said sprocket, and a motor and connections for driving said last named chain.

13. In a mining machine, the combination of a frame or support, two arms pivotally mounted on said support, cutter chains with bits, carried by said arms, power driven means for swinging each arm independently of each other for feeding them into the material to be cut, and means for locking each arm in adjusted position.

14. In a mining machine, the combination of a frame or support, a cutter bar pivoted at the front end of the support, power driven cutting devices carried by said cutter bar, a second cutter bar pivoted to the front end of the support and arranged to swing in substantially the same horizontal plane as the first named cutter bar, power driven cutting devices carried by said second named cutter bar, power driven means for swinging the first named cutter bar in either direction, power driven means for swinging the second named cutter bar in either direction, means for locking the first named cutter bar in adjusted position and means for locking the second named cutter bar in adjusted position.

15. In a machine of the character set forth, the combination of a frame, a shaft journaled in said frame, a motor and driving connections for turning said shaft, a head pivotally mounted concentric with the shaft, a cutter bar carried by said head, a sprocket for said head, a chain engaging with said sprocket, a drive sprocket engaging with said chain, a shaft on which said driving sprocket is mounted, a gear loosely mounted on said shaft, a clutch for connecting said gear to drive the shaft, said clutch also serving to lock the shaft in adjusted position, a worm engaging with said gear, a shaft for said worm, and means for driving said last named shaft.

16. In a mining machine, the combination of a truck, a motor for driving said truck, clutch controlled driving mechanism between the motor and the truck, a cable adapted to be connected with a stationary anchor for pulling the truck, power driven winding means on the truck co-acting with said cable, jacks for holding said truck in adjusted position, a cutter bar pivotally mounted on one side of the truck adjacent to the inner end, a cutter chain carried by said bar, a motor and connecting means for driving said chain, a motor and connecting devices for swinging said cutter bar, means for disconnecting said last named motor, means for locking said cutter bar in adjusted position, a second cutter bar pivotally mounted on the other side of the truck adjacent to the inner end, a cutter chain carried by said bar, a motor and connecting devices for driving said chain, a motor and connecting devices for swinging said second named cutter bar, means for disconnecting said last named motor, and means for locking said last named cutter bar in adjusted position.

17. In a mining machine, the combination with a pair of pivotally mounted swinging cutter frames, endless chains for said cutter frames provided with cutting devices for making a cut in the face of the coal, means for driving said chains, and means for swinging the cutter frames from a diverging position to a substantially parallel position.

18. A mining machine comprising, in combination, a pair of cutting devices, a pair of supports one for each of said cutting devices, means for initially advancing said cutting devices into the work while operating said cutting devices, and means for subsequently imparting movement to each of said supports in opposite directions respectively and in a direction transverse to the direction of their initial advance while continuing to operate said cutting devices.

19. A mining machine comprising, in combination, two cutter bars each provided with its cutter chain and a driving sprocket, pivotal mountings for said cutter bars having axes coincident with the axes of said driving sprockets, and means for contemporaneously swinging said cutter bars on said pivotal mountings in opposite directions while operating both of said cutter chains.

20. A mining machine, in combination, two cutter bars each provided with its cutter chain and a driving sprocket, pivotal mountings for said cutter bars having axes coincident with the axes of said driving sprockets, and means for contemporaneously swinging said cutter bars on said pivotal mountings in opposite directions while operating both of said cutter chains in opposite directions.

21. A mining machine comprising, in combination, two cutter bars each provided with its cutter chain, and means for swinging said cutter bars contemporaneously in opposite directions respectively while operating said cutter chains in opposite directions respectively.

22. A mining machine comprising, in combination, two cutter bars each provided with its cutter chain, means for swinging said cutter bars contemporaneously in opposite directions respectively while operating said cutter chains in draw cut relation to the work.

23. A mining machine comprising, in combination, two cutter frames each provided with its cutter chain, swinging means for swinging said cutter frames contemporaneously in opposite directions respectively, and disconnecting means for operatively disconnecting one of said cutter frames from said swinging means.

24. In mining apparatus the combination of a mining machine having two cutter bars each provided with its cutter chain, and means for swinging said cutter bars contemporaneously in opposite directions while operating said cutter chains in opposite directions respectively, with a support on which said mining machine is adapted to be advanced bodily toward the work.

25. In mining apparatus, in combination, two cutter bars each provided with its cutter chain and a pivotal mounting, means for advancing said cutter bars bodily into the work while said cutter bars are held in fixed relation to the mining machine and in substantially balanced relation to the axis of advancing movement, and swinging means for subsequently swinging said cutter bars in opposite directions to undercut an arcuate kerf in advance of said apparatus.

RALPH E. NOBLE.

Witnesses:
E. H. TILLSON,
IRENE FORREST.